US010986174B1

(12) United States Patent
Sharma et al.

(10) Patent No.: US 10,986,174 B1
(45) Date of Patent: Apr. 20, 2021

(54) AUTOMATIC DISCOVERY AND CONFIGURATION OF SERVER NODES

(71) Applicant: EMC IP Holding Company LLC, Hopkinton, MA (US)

(72) Inventors: Anurag Sharma, Cedar Park, TX (US); Marcelo Daniel Vinante, Georgetown, TX (US); Igal Moshkovich, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/024,912

(22) Filed: Sep. 18, 2020

(51) Int. Cl.
| H04L 29/08 | (2006.01) |
| H04L 12/46 | (2006.01) |
| H04L 29/12 | (2006.01) |
| H04L 12/24 | (2006.01) |

(52) U.S. Cl.
CPC ...... *H04L 67/1031* (2013.01); *H04L 12/4641* (2013.01); *H04L 41/0816* (2013.01); *H04L 61/2092* (2013.01)

(58) Field of Classification Search
CPC ............. H04L 67/1031; H04L 12/4641; H04L 41/0816; H04L 61/2092
See application file for complete search history.

(56) References Cited

U.S. PATENT DOCUMENTS

| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |

(Continued)

FOREIGN PATENT DOCUMENTS

| WO | PCT/US2019/024855 | 1/2020 |
| WO | PCT/US2019/024900 | 1/2020 |

OTHER PUBLICATIONS

Daly, "Base Operating Sytem Provisioning and Bringup for a Commerical Supercomputer", IEEE International Parallel and Distributed PRocessing Symposium, Mar. 2007.*

(Continued)

*Primary Examiner* — Todd L Barker
(74) *Attorney, Agent, or Firm* — Ryan, Mason & Lewis, LLP (57) ABSTRACT

A cluster management system sends a first message over a communications network to detect a server node which runs a base operating system image configured to communicate with the cluster management system to enable discovery and network configuration of the server node. In response to receiving the first message, the base operating system image sends a second message to the cluster management system, wherein the second message includes node identifying information associated with the server node. The cluster management system and the base operating system image communicate to configure network settings of the server node based on server cluster specifications and the node identifying information. Subsequent to completion of the network configuration, the cluster management system automatically provisions the server node for inclusion in a server cluster by re-imaging the server node with a server operating system to enable operation of the server node in the server cluster.

20 Claims, 5 Drawing Sheets

(56) References Cited

U.S. PATENT DOCUMENTS

| | | | |
|---|---|---|---|
| 6,941,420 | B2 | 9/2005 | Butterworth et al. |
| 7,356,679 | B1* | 4/2008 | Le .................. G06F 9/45558 |
| | | | 713/1 |
| 8,843,676 | B2 | 9/2014 | Rajamanickam et al. |
| 9,053,216 | B1* | 6/2015 | Coleman ............... G06F 11/302 |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2008/0279200 | A1* | 11/2008 | Shatzkamer .......... H04L 69/161 |
| | | | 370/401 |
| 2009/0204761 | A1 | 8/2009 | Caprioli et al. |
| 2009/0276593 | A1 | 11/2009 | Jacobson et al. |
| 2010/0082812 | A1* | 4/2010 | Brady ................. H04L 41/0806 |
| | | | 709/226 |
| 2013/0227091 | A1* | 8/2013 | Tompkins ............. G06F 9/5072 |
| | | | 709/220 |
| 2013/0305002 | A1 | 11/2013 | Hallak et al. |
| 2014/0244935 | A1 | 8/2014 | Ezra et al. |
| 2015/0012703 | A1* | 1/2015 | Ashok .................. G06F 9/45558 |
| | | | 711/114 |
| 2015/0363423 | A1* | 12/2015 | Utgikar ................. H04L 67/322 |
| | | | 707/827 |
| 2016/0103764 | A1 | 4/2016 | Banerjee et al. |
| 2017/0109186 | A1* | 4/2017 | Figueroa ............. G06F 9/45558 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2018/0367412 | A1* | 12/2018 | Sethi ................... H04L 41/0853 |
| 2019/0081852 | A1* | 3/2019 | Nazar .................. H04L 41/0613 |
| 2019/0227845 | A1 | 7/2019 | Sridhar et al. |
| 2019/0317787 | A1* | 10/2019 | Wu ..................... G06F 9/45558 |
| 2020/0007584 | A1* | 1/2020 | Dixit ................... G06F 16/2246 |
| 2020/0044920 | A1* | 2/2020 | Patterson ............ H04L 41/0893 |

OTHER PUBLICATIONS

Yokoyama, "Cluster as a Service for self-deployable cloud applications", 12th IEEE/ACM international Symposium on Cluster, Coud and Grid Computing, May 2012.*

Dell EMC, "Dell EMC VxRack Flex," Dell EMC Product Overview, 2018, 5 pages.

G. Soundararajan et al., "Dynamic Resource Allocation for Database Servers Running on Virtual Storage," Fast 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006.1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. filed Mar. 3, 2020, and entitled "Management of Shared Resources in a Software-Defined Storage Environment."

U.S. Appl. No. 16/822,818 filed in the name of Itay Keller et al. filed Mar. 18, 2020, and entitled "Storage System Implementing Snapshot Longevity Ranking for Efficient Management of Snapshots."

U.S. Appl. No. 16/822,848 filed in the name of Itay Keller et al. filed Mar. 18, 2020, and entitled "Assignment of Longevity Ranking Values of Storage Volume Snapshots Based on Snapshot Policies."

U.S. Appl. No. 16/823,813 filed in the name of Itay Keller et al. filed Mar. 19, 2020, and entitled "Managing Incompressible Data in a Compression-Enabled Log-Structured Array Storage System."

U.S. Appl. No. 16/830,469 filed in the name of Roi Tagar et al. filed Mar. 26, 2020, and entitled "Storage Block Balancing Using Volume Part Migration."

U.S. Appl. No. 16/830,473 filed in the name of Yugal Peleg Lieblich et al. filed Mar. 26, 2020, and entitled "Replicated State Cluster with Standby Node State Assessment During Leadership Transition."

U.S. Appl. No. 16/830,946 filed in the name of Gil Ben Zeev et al. filed Mar. 26, 2020, and entitled "Storage Volume Migration Scheduling Based on Storage Volume Priorities and Specified Constraints."

U.S. Appl. No. 16/832,763 filed in the name of Michal Yarimi et al. filed Mar. 27, 2020, and entitled "Managing Storage Device Errors During Processing of Inflight Input/Output Requests."

U.S. Appl. No. 16/834,363 filed in the name of Itay Keller et al. filed Mar. 30, 2020, and entitled "Managing Least Recently Used Cache Using Reduced Memory Footprint Sequence Container."

U.S. Appl. No. 16/836,824 filed in the name of Itay Keller et al. filed Mar. 31, 2020, and entitled of "Management of Volume Snapshots in a Data Storage System."

U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. filed Jul. 1, 2020, and entitled "Sharing Memory Resources Between Asynchronous Replication Workloads."

U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."

* cited by examiner

FIG. 5 ance with server cluster specifications. The cluster
AUTOMATIC DISCOVERY AND CONFIGURATION OF SERVER NODES

TECHNICAL FIELD

This disclosure relates generally to techniques for configuring computing systems and, in particular, to techniques for discovering, configuring, and provisioning server nodes.

BACKGROUND

Various types of engineered software solutions such as software-defined storage (SDS) solutions are constructed using a cluster of server nodes that are configured and provisioned to perform various functions. A cluster management system is typically implemented to manage the operation of the server cluster and allow an administrator to, e.g., construct a new server cluster, expand an existing server cluster with new server nodes, etc., using an application programming interface associated with the cluster management system. In many instances, configuring and provisioning server nodes requires manual operations by the system administrator, which is time consuming and can lead to misconfigurations due to human error. Indeed, before a server node can be included in a server cluster, the server node needs to be properly configured in accordance with specifications of the software solution stack of the server cluster.

Some software solutions follow a model in which server nodes are pre-configured, tested, and certified (in the factory) to run a given software solution stack. While these pre-configured server nodes can save installation time at the customer site, such server nodes still require manual network configuration and discovery before they can join a server cluster. Furthermore, while some software solutions implement functions to support automated switch and network configuration for ease of use to the customer, such solutions still require a data center administrator to manually configure management IP addresses for the server nodes after racking and stacking the server nodes, which can lead to network misconfigurations due to human error.

SUMMARY

Exemplary embodiments of the disclosure include techniques for automatically discovering, network configuring, and provisioning server nodes. For example, in one exemplary embodiment, a cluster management system is configured to perform a method to automatically discover, network configure, and provision server nodes for inclusion in a server cluster. The cluster management sends a first message over a communications network to detect a server node connected to the communications network, wherein the server node runs a base operating system image that is configured to communicate with the cluster management system to enable the cluster management system to automatically detect the server node and to automatically configure the server node for inclusion in a server cluster in accordance with server cluster specifications. The cluster management system detects the server node in response to receiving a second message that is sent from the base operating system image of the server node in response to the first message, wherein the second message comprises node identifying information associated with the server node. The cluster management system communicates with the base operating system image of the server node to perform a network configuration process to automatically configure one or more network settings of the server node based at least in part on the server cluster specifications and the node identifying information provided by the base operating system image of the server node. Subsequent to completion of the network configuration process, the cluster management system performs a provisioning process to automatically provision the server node for inclusion in the server cluster, wherein the provisioning process comprises re-imaging the server node with a server operating system to enable operation of the server node in the server cluster.

Other embodiments of the disclosure include, without limitation, systems and articles of manufacture comprising processor-readable storage media, which are configured to automatically discover, network configure, and provision server nodes for inclusion in a server cluster.

DETAILED DESCRIPTION

Exemplary embodiments of the disclosure will now be discussed in further detail with regard to systems and methods for automatically discovering, network configuring, and provisioning bare metal server nodes. For purposes of illustration, exemplary embodiments will be described herein with reference to exemplary information processing systems which implement data processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
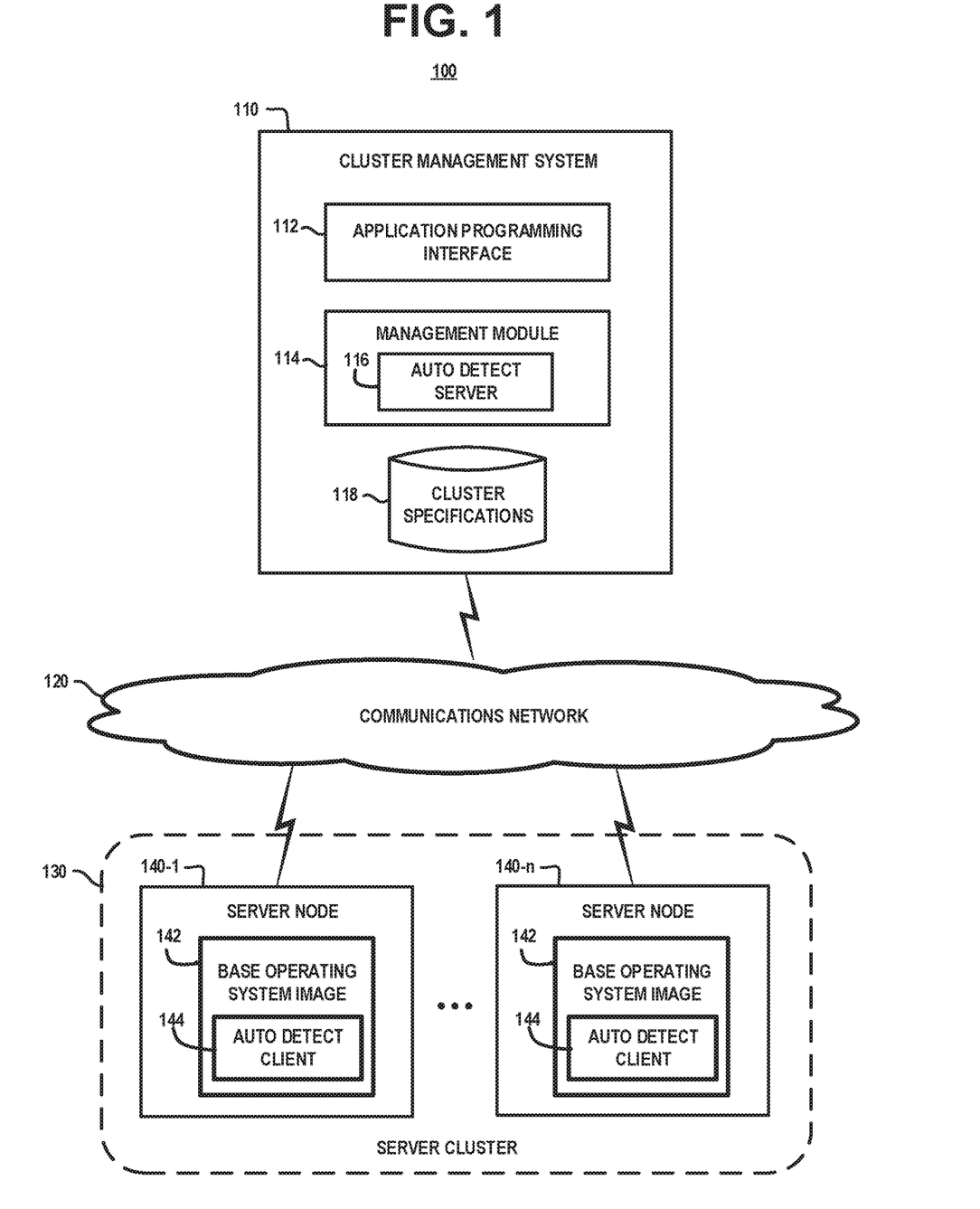
FIG. 1 schematically illustrates an information processing system which is configured to automatically discover, network configure, and provision server nodes, according to an exemplary embodiment of the disclosure.

FIG. 1 schematically illustrates an information processing system which is configured to automatically discover, network configure, and provision server nodes, according to an exemplary embodiment of the disclosure. In particular, FIG. 1A schematically illustrates an information processing system 100 which comprises a cluster management system 110, a communications network 120, and a server cluster 130 comprising a plurality of server nodes 140-1, . . . , 140-n (collectively, server nodes 140). The cluster management system 110 comprises an application programming interface 112, a management module 114 which comprises an auto detect server (ADS) 116, and a datastore to persistently store cluster specifications 118. The server nodes 140 each comprise a base operating system image 142 which comprises an auto detect client (ADC) 144.

In the exemplary embodiment of FIG. 1, it is assumed that the server nodes 140 comprise "bare metal server nodes" that are automatically detected, network configured, and provisioned through communication between the cluster management system 110 and the base operating system images 142 of the server nodes 140. For example, as explained in further detail below, the auto detect server 116 and the auto detect clients 144 exchange messages to implement an auto detect protocol (ADP) that is performed to, e.g., automatically discover and network configure the server nodes 140. The term "bare metal server node" refers to a physical server machine which is not deployed with a complete server operating system (OS) that is booted upon startup of the server node, but rather is deployed with the bootable base operating system image 142 (e.g., generic ISO image) which is configured to support various functions to enable the automatic discovery, validation, and network configuring of the bare metal server nodes 140 for deployment in a server cluster (e.g. cluster 140) that supports a given software stack solution. As explained in further detail below, the base operating system image 142 is a bootable OS-agnostic image which includes the auto detect client 144 that is configured to communicate with the auto detect server 116 over the communications network 120 to discover and network configure a given server node. Following the network configuration of a given bare metal server node 140, the cluster management system 110 is configured to re-image the given bare metal server node 140 with one or more operating systems (e.g., host operating system, container operating system, etc.) to enable operation of the given server node 140 in the server cluster 130.

The cluster management system 110 is configured to manage a server cluster for a given software stack solution. For example, in some embodiments, the cluster management system 110 comprises a container orchestration platform (e.g., Kubernetes) which comprises automated functions for deploying, managing, and scaling containerized applications. In this instance, the cluster 130 of server nodes 140 in FIG. 1 can be configured to run, e.g., Linux containers for a given application. By way of further example, in some embodiments, the cluster management system 110 comprises a management layer of a software-defined storage environment. In this instance, the cluster management system 110 is configured to supervise operations of a cluster of server nodes in which the server nodes contribute their local storage resources (e.g., hard disk drives (HDDs), solid-state drives (SSDs), flash memory, etc.) to an aggregated pool of storage to implement a server-based storage area network (SAN), wherein the cluster management system 110 is configured to support and manage the configuration and "scale-out" of the software-defined storage environment.

The application programming interface 112 (e.g., web-based API) implements methods that are configured to allow system administrators to input cluster specifications into the cluster management system 110. The cluster specifications are persistently stored in the datastore 118 and utilized by the management module 114 and the auto detect server 116 for performing various functions associated with configuring server nodes of a server cluster, configuring a network environment for the server cluster, and provisioning and deploying a given software solution on the server cluster, etc. The cluster specifications 118 include information including, but not limited to, allowed ranges of IP (internet protocol) addresses for IP assignment, VLAN (virtual local area network) settings, MTU (maximum transmission unit) settings, specifications for validating server nodes, and other types of network guardrails that are to be applied for the given cluster and network environment. As explained in further detail below, the auto detect server 116 utilizes the cluster specifications 118 to perform various functions associated with automatically validating bare metal server nodes that are discovered, configuring network settings for the bare metal server nodes to operate as a cluster within a given network environment, etc.

It is to be understood that the cluster management system 110 is generically illustrated in FIG. 1, wherein the exemplary components of the cluster management system 110 shown in FIG. 1 comprise components which can be implemented to enable the automatic discovery, network configuration, and provisioning of bare metal server nodes. In this regard, it is to be understood that the cluster management system 110 will include additional modules and other components that are typically utilized for cluster management for a given network environment and software solution. Such additional modules and other components are omitted for clarity and simplicity of illustration. In addition, the various components of the cluster management system 110 can execute on a given computing device (e.g., laptop computer, server node, etc.) or be distributed over a plurality of computing devices.

The cluster management system 110 and the server nodes 140 communicate over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

Figure 2:
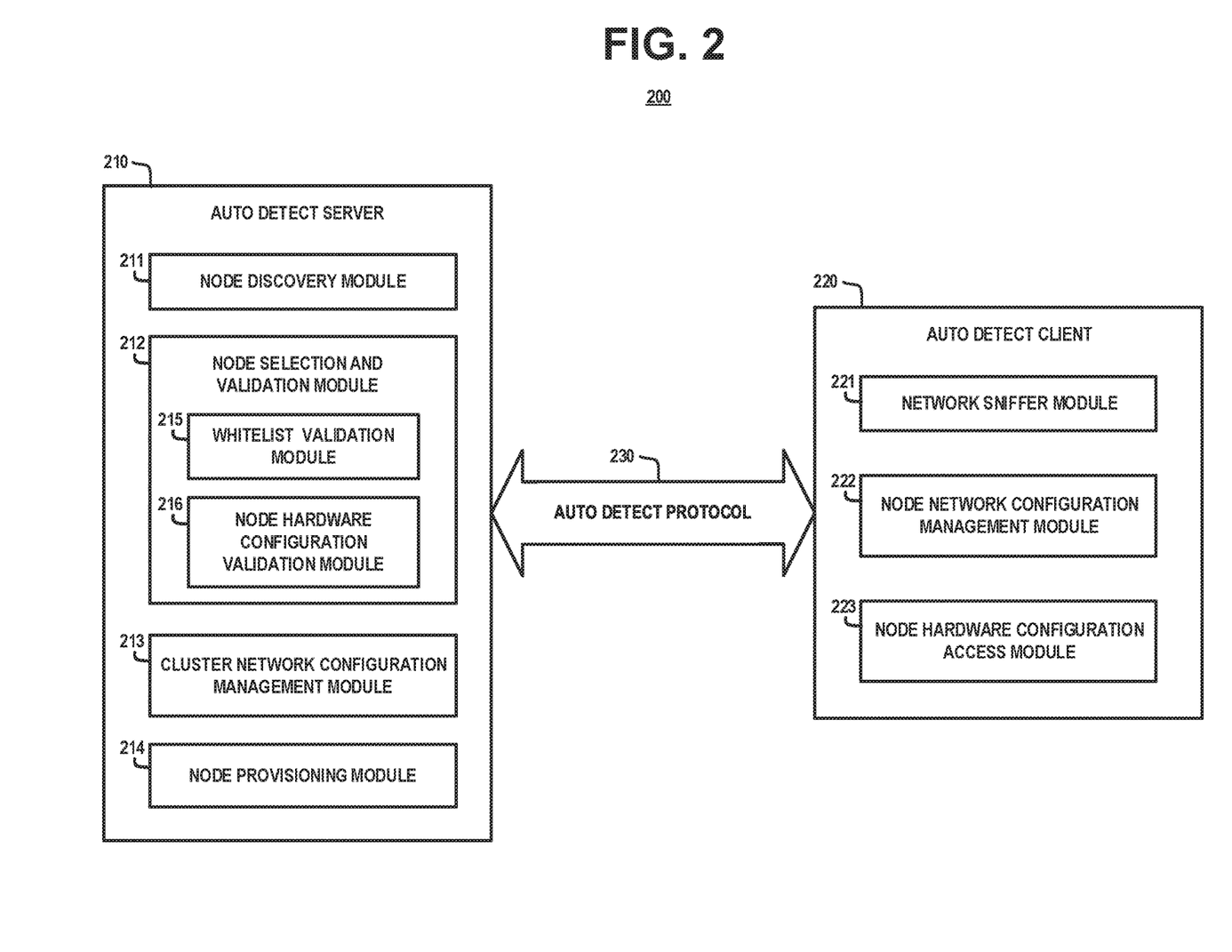
FIG. 2 schematically illustrates a system for automatically discovering, network configuring, and provisioning server nodes, according to an exemplary embodiment of the disclosure.

FIG. 2 schematically illustrates a system for automatically discovering, network configuring, and provisioning server nodes, according to an exemplary embodiment of the disclosure. More specifically, FIG. 2 schematically illustrates a system 200 comprising an auto detect server 210, and an auto detect client 220. The auto detect server 210 and the auto detect client 220 execute an auto detect protocol 230 to automatically discover and network configure a given bare metal server node which runs the auto detect client 220. In some embodiments, FIG. 2 illustrates exemplary embodiments of the auto detect server 116 and the auto detect clients 144 shown in FIG. 1.

The auto detect server 210 comprises a node discovery module 211, a node selection and validation module 212, a cluster network configuration management module 213, and a node provisioning module 214. The node selection and validation module 212 comprises a node whitelist validation module 215, and a node hardware configuration validation module 216. The auto detect client 220 comprises a network sniffer module 221, a node network configuration management module 222, and a node hardware configuration access module 223. The various modules of the auto detect server 210 and the auto detect client 220 implement respective functions to execute various protocol stages of the auto detect protocol 230. In some embodiments, the protocol stages of the auto detect protocol 230 comprise a server node discovery stage, a network configuration stage (e.g., setting a management IP address), and a server node provisioning stage. As explained in further detail below, the auto detect protocol 230 is based on zero-configuration networking (zeroconf) and utilizes the auto detect client 220 (host agent, daemon) running within the base operating system image that is pre-installed in the bare metal server node with a special network configuration that enables the auto detect client 220 to listen to a probe message that is broadcast from the auto detect server 210 of the cluster management system 110 at the customer site.

In some embodiments, the node discovery module 211 and the network sniffer nodule 221 implement methods that are configured to perform a server node discovery stage of the auto detect protocol 230. For example, the node discovery module 211 implements methods that are configured to detect the presence of one or more bare metal server nodes which are connected to a communications network and which are running an active instance of an auto detect client 220. For example, in some embodiments, the node discovery module 211 is configured to broadcast a probe message which can be detected by the auto detect client 220, and to detect a reply message that is sent from the auto detect client 220 in response to the probe message, as part of a node discovery stage of the auto detect protocol 230. For example, in some embodiments, the probe message comprises a Layer 2 user datagram protocol (UDP) message that is broadcast on a given TCP port (e.g., port 33333) to probe the active auto detect clients over a communications network, and then proceed to listen on a given port (e.g., port 33833) for reply messages from the auto detect clients the bare metal server nodes. In this embodiment, it is assumed that the bare metal server nodes are in the same broadcast domain/VLAN as the cluster management system that hosts the auto detect server.

In some embodiments, the network sniffer module 221 is configured to listen in a promiscuous mode to all interfaces (e.g., logical ports) to detect a probe message. In some embodiments, the network sniffer module 221 is configured to listen on a pre-specified port (e.g., TCP/UDP port 33333) for an incoming probe message which is broadcast from the auto detect server 210 to initiate the auto detect process. In some embodiments, the network sniffer module 221 is configured to send a reply message to the auto detect server 210 in response to the probe message. In some embodiments, as explained in further detail below, the reply message is a unicast UDP message which comprises, among other things, node identifying information (e.g., node ID, node type, etc.) associated with the bare metal server node.

In some embodiments, to support jumbo frames (i.e., Ethernet frames with more than 1500 bytes of payload), and VLAN tagging on already preconfigured switches, the auto detect client 220 is configured to support ethernet packets that arrive with VLAN tagging and an MTU set to jumbo frames. In some embodiments, the auto detect client 220 can be configured to support multiple ports to allow the auto detect server 210 to determine which port to select for a management interface between the cluster manager and the server node based on, e.g., the connected network interface card on which packets are received from the auto detect server 210. For example, a server node can have network interface cards for different networks, e.g., 1G network for management and a 10G network for data.

In this regard, a server node can be connected to the auto detect server 210 via multiple ports wherein a mechanism is utilized to enable a "smart" selection of a target port for, e.g., the management interface. The "smart" port selection provides a level of security/protection by allowing the auto detect server to select a non-standard port for a management interface. This also allows segregation of different server nodes for different applications and solutions. Moreover, this allows different versions/releases of the same application to be differentiated by different port numbers.

In some embodiments, the node selection and validation module 212 implements methods that are configured to automatically select and validate bare metal server nodes, which are detected by the node discovery module 211, for inclusion in a server cluster for a given application. In general, the node selection and validation module 212 utilizes pre-specified criteria (e.g., cluster specifications 118, FIG. 1) to determine if a detected bare metal server node is permitted or otherwise authorized to be included in a given cluster for a given software solution. The whitelist validation module 215 and the node hardware configuration validation module 215 utilize various types of criteria for selecting and validating bare metal server nodes.

More specifically, in some embodiments, the whitelist validation module 215 implements methods that are configured to automatically select and validate bare metal server nodes by utilizing a whitelist which includes information that identifies bare metal server nodes which are permitted to be included in a given cluster for a given software solution. For example, the whitelist can include server node information such as server node serial numbers, server node MAC addresses, permitted server node types (e.g., PowerEdge R740 Server, PowerEdge R640 Server, etc.), and other types of information to identify server nodes.

When a given bare metal server node is detected by the node discovery module 211, the whitelist validation module 215 initiates a whitelisting validation process which comprises comparing the identifying information of the given bare metal server node (which is extracted from the received reply message) with server node information in a given whitelist of permitted server nodes to determine whether the given bare metal server node is deemed valid and permitted to be included in a given server cluster for a given application. In some embodiments, a whitelist is generated by a system administrator and stored as part of the cluster specifications 118 of the cluster management system 110 (FIG. 1). It is to be understood that the term "whitelist" as used herein is to be broadly construed to mean any type of listing of information regarding bare metal server nodes which can be utilized to select and validate bare metal server nodes for inclusion in a server cluster, irrespective of the methods and data structures utilized to generate and maintain such listing of server node information.

The node hardware configuration validation module 216 implements methods that are configured to communicate with the auto detect client 220 of a given bare metal server node to request and obtain information of the server node such as, e.g., an inventory of the hardware (e.g., processors, storage, memory, etc.) of the given server node, an operational state of the hardware, etc. This allows the auto detect server 210 to automatically determine whether a given bare metal server node has sufficient hardware to support a given application and/or determine if the hardware is operating in an optimal or sub-optimal state, etc. In some embodiments, the auto detect server 210 utilizes such hardware information to determine whether a given bare metal server node qualifies for inclusion in the server cluster based on cluster specifications. In other words, the node hardware configuration validation module 216 allows the auto detect server 210 to automatically validate a server node configuration based on hardware inventory information provided by the node hardware configuration access module 223 of the auto detect client 220.

In some embodiments, the auto detect client 220 implements the node hardware configuration access module 223 to determine a hardware inventory of a given bare metal server node, and responds to hardware inventory queries received from the node hardware configuration validation module 216 of the auto detect server 210. In some embodiments, the node hardware configuration access module 223 utilizes operating system level commands to collect hardware and system information of the bare metal server node. In some embodiments, the node hardware configuration access module 223 implements functions that are the same and/or similar to the functions that are implemented by a remote access management control system such as a baseboard management controller (BMC) system. In some embodiments, when a given bare metal server node actually implements a BMC system, the auto detect server 210 (or more generally, the cluster management system 110, FIG. 1) can remotely access the BMC system of the server node to obtain hardware/firmware and system state information of the bare metal server node, after the bare metal server node and the BMC system is properly configured and provisioned.

In other embodiments, the node selection and validation module 212 can implement methods that allow a system administrator to manually select one or more bare metal server nodes, which are detected by the node discovery module 211. In such embodiments, the node selection and validation module 212 can generate a list of bare metal server nodes that are detected by the node discovery module 211 as part of a node discovery process, and then display the list of discovered bare metal server nodes to enable manual selection of one or more of the detected bare metal server nodes by the system administrator. In some embodiments, the node selection and validation module 212 can be configured to provide an application programming interface that allows a system administrator to manually select options for filtering the list of discovered server node by selecting filtering parameters based on, e.g., node types, hardware inventory, etc.

The cluster network configuration management module 213 implements methods that are configured to determine network configuration parameters that are to be applied for a given bare metal server node for inclusion in a server cluster. In some embodiments, the cluster network configuration management module 213 determines one or more network settings for a given server node based at least in part on server cluster specifications and node identifying information provided from by the base operating system image and auto detect client of the given server node.

The node network configuration management module 222 of the auto detect client 220 implements methods that are configured to automatically configure network settings of the given bare metal server node. For example, in some embodiments, the auto detect client 220 is configured to utilize Automatic Private IP Addressing (APIPA) to automatically assign IP addresses that are utilized to communicate with the auto detect server over a management interface. For example, in some embodiments, during boot-up of a given bare metal server node, the node network configuration management module 222 of the auto detect client 220 will allocate an APIPA address for the management interface from a pre-specified range of IP addresses (e.g., 169.254.0.0-169.254.255.255), wherein an address resolution protocol (ARP) process can be implemented to resolve the uniqueness of the private IP address. Furthermore, the node network configuration management module 222 is configured to apply network configuration settings on the given server node as instructed by the auto detect server 210. For example, such network configuration settings include, but are not limited to, VLAN configuration settings (e.g. VLAN ID), MTU configuration settings, port assignments to be utilized for a management network interface, a data network interface, etc.

The node provisioning module 214 implements methods that are configured to automatically perform a provisioning process to provision the server node for inclusion in the server cluster. For example, a provisioning process comprises re-imaging the server node with a server operating system to control operation of the server node in the server cluster. Moreover, the provisioning process may comprise operations including, but not limited to, configuring BIOS settings, configuring BMC settings, selecting boot drives and data drives, formatting a boot partition, configuring a RAID controller, and configuring other systems or components of the server node so that the server node will boot to the server operating system and be ready for operation in a given cluster for a given application.

Figure 3:
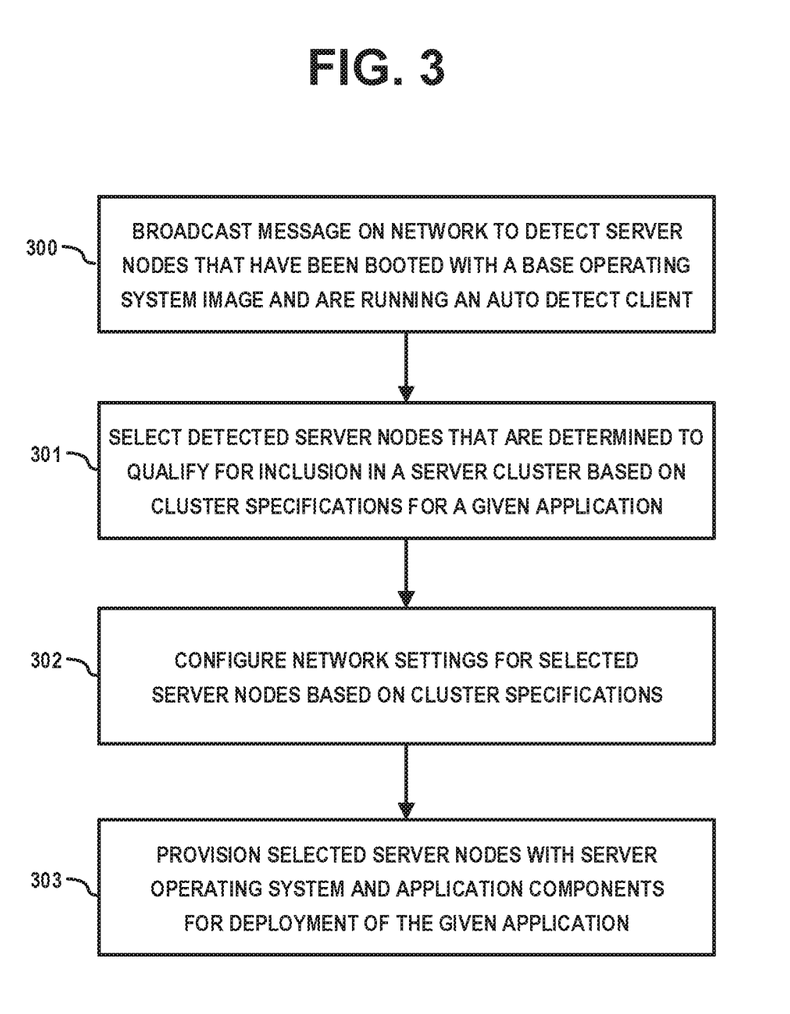
FIG. 3 is a flow diagram of a method for automatically discovering, network configuring, and provisioning server nodes, according to an exemplary embodiment of the disclosure.
Figure 4:
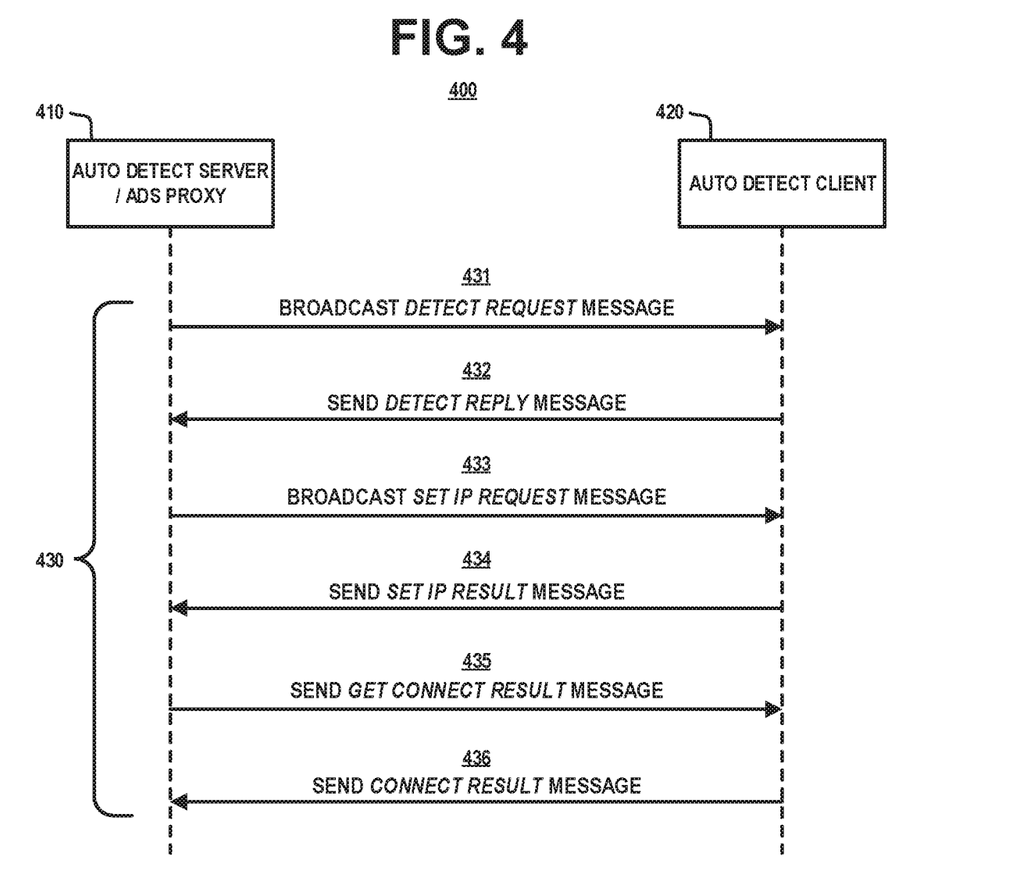
FIG. 4 illustrates messages that are communicated between an auto detect server and an auto detect client to implement a method for discovering and network configuring server nodes, according to an exemplary embodiment of the disclosure.

Various techniques for automatically discovering and configuring server nodes will now be discussed in further detail with reference to FIGS. 3 and 4. In particular, FIG. 3 is a flow diagram of a method for automatically discovering and configuring server nodes, according to an exemplary embodiment of the disclosure. Further, FIG. 4 illustrates messages that are communicated between an auto detect server and an auto detect client to implement a method for discovering and configuring server nodes, according to an exemplary embodiment of the disclosure. In some embodiments, FIGS. 3 and 4 illustrate exemplary operating modes of the auto detect server 210 and the auto detect client 220 as shown in FIG. 2 to implement an auto detect protocol. For purposes of discussion, it is assumed that one or more bare metal server nodes (e.g., server nodes 140, FIG. 1) have been connected to a network (e.g., communications network 120, FIG. 1), wherein each of the bare metal server nodes comprises a base operating system image having an auto detect client. It is also assumed that a network administrator has input cluster specifications (e.g., IP address ranges, types of servers, MTU settings, VLAN settings, port assignments, etc.) to a cluster specifications data store (e.g., cluster specification 118) via an application programming interface (e.g., API 112) of the cluster management system 110 in FIG. 1.

The bare metal server nodes are booted up using their respective base operating system images. On boot-up, the auto detect clients of the respective bare metal server nodes will be instantiated and automatically activated to enable discovery of the bare metal server nodes. As noted above, in some embodiments, the bare metal server nodes are preconfigured to utilize APIPA to automatically assign IP addresses that are utilized to communicate with the auto detect server over a management interface. For example, in some embodiments, during boot-up of a given bare metal server node, the node network configuration management module 222 of the auto detect client 220 will allocate an APIPA address for the management interface from a pre-specified range of IP addresses (e.g., 169.254.0.0-169.254.255.255).

Referring now to FIG. 3, an auto detect process commences by the auto detect server broadcasting a message on the network to detect bare metal server nodes that have been booted with a base image and running an auto detect client (block 300). For example, the auto detect server will broadcast a probe message on a given port to probe the active auto detect clients over the communications network, and then proceed to listen on a given port for reply messages from the auto detect clients of the bare metal server nodes. In this embodiment, it is assumed that the bare metal server nodes are in the same broadcast domain/VLAN as the cluster management system that hosts the auto detect server.

For the one or more bare metal server nodes that are automatically detected, the auto detect server will select one or more (or all) of the detected bare metal server nodes which are determined to qualify for inclusion in a server cluster based on cluster specifications for a given application (block 301). For example, as noted above, in some embodiments, the auto detect server will utilize node identifying information (e.g., node ID, node type, etc.) of a given bare metal server node to determine if the server node is permitted to be included in a given server cluster for a given application. Further, in some embodiments, the auto detect server will utilize hardware information of the given bare metal server node to determine if the given bare metal server node has sufficient hardware capability to be included in a given server cluster for a given application.

The auto detect server will then proceed to provide network configuration information to each of the selected bare metal server nodes to enable the auto detect clients of the respective bare metal server nodes to configure the network settings of the selected bare metal server nodes based on the cluster specification (block 302). For example, such network configuration settings include, but are not limited to, VLAN configuration settings (e.g. VLAN ID), MTU configuration settings, port assignments to be utilized for a management network interface, a data network interface, etc.

Subsequent to verifying that the network configuration of a given bare metal server node is complete, the auto detect server will perform a provisioning process to automatically provision the server node for inclusion in the server cluster and deployment of the given application (block 303). For example, provisioning process comprises re-imaging the server node with a server operating system to enable operation of the server node in the server cluster, provisioning the server node with application components for the given application, and performing other types of server provisioning and configuration operations as discussed herein.

FIG. 4 illustrates messages that are communicated between an auto detect server and an auto detect client to implement a method 400 for discovering and configuring server nodes, according to an exemplary embodiment of the disclosure. More specifically, FIG. 4 illustrates messages that are exchanged between an auto detect server 410 (or alternatively, auto detect server (ADS) proxy 410) and an auto detect client 420 of a given bare metal server node to implement a server node discovery stage and a network configuration stage of an auto detect protocol 430. In some embodiments, the auto detect server 410 and the auto detect client 420 implement the constituent modules as shown in FIG. 2. As noted above, the auto detect server 410 should be on the same broadcast domain/VLAN as the bare metal server node. In this regard, an auto detect protocol is configured to support a proxy capability which allows an auto detect server proxy (ADS proxy) to operate on a local communications network with the bare metal server nodes in an instance where the cluster management system is located in central site and the bare metal server nodes are located in a remote site. In this embodiment, the primary auto detect server of the cluster management system will forward packets the ADS proxy, where the ADS proxy then sends the packets to the auto detect clients.

As illustrated in FIG. 4, as part of the server node discovery stage, the auto detect server 410 (or ADS proxy 410) broadcasts a DETECT REQUEST message 431 (e.g., Layer 2 UDP message) over a communications network to probe the auto detect clients of the bare metal server nodes that are connected to the communications network. In some embodiments, a DETECT REQUEST message can be structured as follows:

{
sessionTimeout:75,
sourceAddr: ('2620:0:170:8105:10:136:214:999', 33335, 0, 0),
vlanId: 1500,
sessionCookie:cfaf05d0-6a2d-4d9a-b4ed-fa2aec25f920
}

In this example embodiment, the DETECT REQUEST message supports a session timeout and a session cookie, and specifies a VLAN identifier to identify the VLAN/broadcast domain. The VLAN ID is included in a tag of the Layer 2 header of the probe message transmitted on a VLAN. The auto detect client 420 of a given bare metal server node detects and receives the broadcast DETECT REQUEST message. In response, the auto detect client 420 configures the VLAN settings of the bare metal server node to match such settings associated with the DETECT REQUEST message received on the management interface so that a subsequent reply message can be sent. In some embodiments, the MTU of the bare metal server nodes can be preset to a default value, which is subsequently reset by the auto detect client 420 according to a MTU setting provided by the auto detect server 410 as part of the network configuration stage. In addition, as part of the server node discovery stage, the auto detect client 420 identifies itself to the auto detect server 410 by sending a DETECT REPLY message 432 to the auto detect server 410. In some embodiments, the DETECT REPLY message 432 comprises a unicast UDP message, which comprises the following information and parameters:

{
"nodeType":"R730 Base",
"buildVersion":"2.0.184.1",
"nodeId":"CN7792162R047G",
"sessionCookie":" ", "ip6":"fe80::20c:29ff:feec:3cb4",
"esxIp6":"fe80::250:56ff: fe67:1bd4/64",
"ip4":"169.254.97.179",
"esxIp4":"169.254.240.67",
"chassisSlot":"ff",
"brickId": "CD1DGB2"
}

In this example embodiment, the auto detect server 410 receives a DETECT REPLY message from the auto detect client 420 and obtains various types of information associated with the bare metal server node such as, e.g., the type of server node (e.g., R730 Base), a unique chassis service tag/serial number (aka "brickid") of the server node, an APIPA IP address of the auto detect client 420 to enable further communication, etc. The auto detect server 410 will receive a separate DETECT REPLY message from each corresponding auto detect client that responds to the DETECT REQUEST message, wherein each DETECT REPLY message will comprise information that is unique to the associated bare metal server node.

As noted above, in some embodiments, auto detect server 410 will utilize such unique server node information to select those detected server nodes which are deemed to qualify for inclusion in a given server cluster based on cluster specifications associated with the given server cluster and/or given application platform that is to be implemented by the server cluster. In some embodiments, after sending the DETECT REPLY message to the auto detect server 410, the auto detect client 420 will revert the IP setting back to an "unconfigured" mode (e.g., no VLAN or MTU setting). This reversion is to address a situation where the given bare metal server node while detected, is not selected for at the given time for inclusion in the server cluster. This allows the given server node to be ready for future discovery.

As further illustrated in FIG. 4, as part of the network configuration stage of the auto detect protocol 430, the auto detect server 410 will proceed to set a management IP address by broadcasting a SET IP REQUEST message 433 on a given port (e.g., UDP message on port 33333) to the auto detect clients of the detected (and selected) bare metal server nodes. In some embodiments, SET IP REQUEST message is structured as follows:

[{
"nodeId": "CN7792162R047G",
"sessionCookie":" ",
"ip6":"0:0:0:0:0:ffff:a88:d7cc",
"ip4":"10.136.215.204",
"vlan": 1500,
"MTU": 5600,
"mgmt_interface": "eth0",
},
{
"nodeId": "CN7792162R047H",
"sessionCookie":" ",
"ip6":"0:0:0:0:0:ffff:a88:d7cd",
"ip4":"10.136.215.205",
"vlan": 1500,
"MTU": 5600,
"mgmt_interface": "eth1",
},
... ]

Each auto detect client (e.g., auto detect client 420) receives the SET IP REQUEST message and filters the message based on the "nodeId" for its corresponding bare metal server node to obtain the network configuration information specified by the auto detect server 410 for the bare metal server node. For ease of illustration, the exemplary SET IP REQUEST message shows two separate blocks of network configuration information for two different server nodes with respective node IDs CN7792162R047G and CN7792162R047H. The SET IP REQUEST message will not include network configuration information for a given bare metal server node that while detected during the discovery process, was not selected by the auto detect server 410 at the given time to proceed with the network configuration process.

As shown above, the SET IP REQUEST message includes the IP addresses that are assigned to the selected bare metal server nodes by the auto detect server 410. In addition, the SET IP REQUEST from the auto detect server 410 includes a VLAN ID, and MTU settings for network configuring the bare metal server nodes. The auto detect client 420 sets its IP address to match the IP address specified in the received SET IP REQUEST message. Furthermore, in some embodiments as shown above, the SET IP REQUEST message will also include port assignments for the server nodes to implement a management interface between the cluster management system and the server nodes.

As further illustrated in FIG. 4, as part of the network configuration stage of the auto detect protocol 430, the auto detect client 420 will send a SET IP RESULT message 434 to indicate a success/failure of the process for configuring the IP management address. In some embodiments, the SET IP RESULT message is a unicast UDP message, wherein each auto detect client will send a corresponding SET IP RESULT message to the auto detect server 410. In response to a successful configuration of the IP management address, the auto detect server 410 will connect to the auto detect client 420 using a secure network protocol (e.g., a Secure Shell (SSH) cryptographic network protocol) and the configured IP address, and then proceed to set a new root user password and place a cookie file on the auto detect client 420.

The auto detect server 410 sends a GET CONNECT RESULT message 435 (e.g., unicast UDP message) to the auto detect client 420 to check the cookie. The auto detect client 420 receives the GET CONNECT RESULT and, in response to such message, proceeds to verify the cookie. The auto detect client 420 sends a CONNECT RESULT message 436 (e.g., unicast UDP message) to the auto detect server 410. In response to receiving the CONNECT RESULT message from the auto detect client 420, the auto detect server 410 deems that the network configuration stage of the auto detect protocol 430 is complete and without error, at least with respect to the auto detect client 420 which sent the CONNECT RESULT message. If no CONNECT RESULT message is received from the auto detect client 420, the auto detect server 410 will repeat the process flow (for a pre-specified maximum number of attempts) to configure and validate the network connection with the auto detect client 420.

Following completion of the network configuration stage (e.g., set management IP address process), the auto detect client 420 is turned off to terminate the associated auto detect client services and processes. If any check fails at any stage of the auto detect protocol, the auto detect client 420 will revert the IP address back to the APIPA IP address, and continue to listen using the promiscuous mode sniffer ability for another probe message (e.g., DETECT REQUEST message) or a SET IP REQUEST message (retry message or new message).

Following the server node discovery and network configuration stages, the auto detect server 410 can perform an automated server node provisioning stage to prepare the bare metal server nodes for joining a server cluster. For example, as noted above, a provisioning process includes operations such as re-imaging a bare metal server node with one or more operating systems (e.g., Red Hat Enterprise Linux (RHEL) operating system, a Community Enterprise Operating System (CENTOS), Ubuntu operating system, a hypervisor platform (e.g., ESXi), etc.). In addition, the auto detect server 410 can provision the server node by, e.g., configuring BIOS settings, configuring BMC settings, selecting boot drives and data drives, formatting a boot partition, configuring a RAID controller, configuring hardware, disks, installing various device drivers, OS patches, NTP, DNS, LDAP and software components, and other provisioning and configuring operations that may be need to make the server node ready for operation in the server cluster for a given application.

In some embodiments, the server node provisioning stage includes an auto detect server taking an inventory of the hardware and/or firmware configuration of the server node. The auto detect server can perform firmware updates on a given bare metal server node using known methods such as utilizing BIN files or utilizing a configured BMC system on the server node to update the firmware and/or drivers of the server node.

In other embodiments, a cluster management system (comprising an auto detect server) can be utilized to rollback a deployed server node to a factory state in which the server node is re-imaged with the base operating system image with the auto detect client and then booted up using the base operating system image. For example, this allows the cluster management system to restore an evicted server node to the factory base operating system image so that the server node can be repurposed for another cluster or solution. More specifically, after a given node is configured and provisioned, a customer may want the server node to host a new application, or different operating system (e.g., Linux machine with KB8 hypervisor). In this instance, the server node would be rebooted with the base operating system image and auto detect client, and an ADP protocol would be implemented to reconfigure the network settings and provision the server node for the new target solution.

In other embodiments, in the event of a server node failure event, the cluster management system can be utilized to rollback a failed server node to a factory state in which as part of a recovery process, the server node is re-imaged with the base operating system image with the auto detect client and then booted up using the base operating system image. For example, there can be an instance in which the server operating system image of given server node fails due to, e.g., failure of a boot disk, which requires field replacement of a new boot device. In this instance, after replacement of the new boot device, the server node would be rebooted with the base operating system and auto detect client, and an ADP protocol would be implemented as part of a server node recovery process to configure the network settings and provision the server node and restore the server node to its previously existing configuration before the failure. In this instance, the custom configuration of the server node is stored as part of the cluster specifications, and accessed for the node recovery process.

In some embodiments, a deployed server node (which has failed, or is being repurposed) can be rolled back to the initial factory state by the cluster management system re-installing the base operating system image with the auto detect client on the server node and configuring the server node to boot up using the base operating system image. In other embodiments, the base operating system image with the auto detect client can be maintained on a separate drive (e.g., secure digital (SD) drive, etc.) of the server node and subsequently accessed by the cluster management system to restore the server node to the initial factory state. In this instance, the cluster management system can configure the server node to change the boot partition and/or boot order so that the server node will be booted up using the base operating system image and auto detect client which resides on the, e.g., SD drive, of the server node.

An auto detect protocol according to embodiments of the disclosure as discussed herein provide various advantages with regard to the automated discovery, network configuration, and provisioning of bare metal server nodes. An auto detect protocol supports timeouts, session cookies, reverts, and connectivity tests after setting IP addresses. An auto detect protocol provides for a secure, automated and parallel discovery of multiple bare metal nodes which is advantageous for software solutions (e.g., software-defined storage solutions) that allow elastic scale-out of a server cluster having a large number of nodes (e.g., up to 1024 nodes). An auto detect protocol supports a generic, base operating system image with an auto detect client, which can be factory configured and remain generic across multiple releases of a given software solution, i.e., independent of software solution stack release cycle.

Furthermore, an auto detect protocol is configured to automatically assign and test connectivity using IP addresses that are selected from a range of IP address provided as part of cluster specifications for setting up a complex server cluster and network environment. The auto detect protocol eliminates or significantly minimizes the need for manual operation and, thus, significantly reduces the chances of network misconfiguration due to human error. For many complex data storage and computing environments, the network configuration plays the critical role to support speed, high availability (HA), data redundancy, replication, etc.

Moreover, an auto detect protocol can be implemented with a cluster management system operating in a discovery/proxy mode in which the primary auto detect server will forward packets to a proxy auto detect server which sends the packets to the auto detect clients. The proxy capability allows a proxy auto detect server to be set up on a local network of a data center with the bare metal server nodes, even if the primary auto detect server/cluster manager is located in a central site which is remote from the data center.

Furthermore, as noted above, the auto detect protocol supports layer 2 VLAN tagging during discovery and jumbo frame MTU settings, as well as providing support for automated discovery based on multiple versions of the Internet Protocol such as IPv4 and IPv6.

Moreover, since factory cycles are expensive, creating a simple generic operating system image for the bare metal server nodes which post discovery can be replaced with an actual released image that is continually patched, makes the solutions discussed herein (i) OS agnostic and (ii) able to support multiple appliance platforms that have different images. In another embodiment, another option would be to use a single image and have a factory process change the auto detect client port per platform.

Since an administrator may wish to perform deployment of several systems and not select all nodes in a single discovery, a given bare metal server node that is not selected for the network parameter configuration stage will remain/revert to listen for another probe message for a discovery mode. If a bare metal server node is selected and configured with an IP address, a root password, and VLAN and MTU settings, then post successful configuration the auto detect client and associated services will be turned off including future reboot. Moreover, the auto detect protocol can support multiple ports on a given bare metal server node and allows a "smart" selection of ports to utilize for a management interface based on, e.g., the connected network interface card on which packets are received from the auto detect server 210. This will require handling of cases where a node is connected to an auto detect server via multiple ports and allowing "smart" select of target management port.

Figure 5:
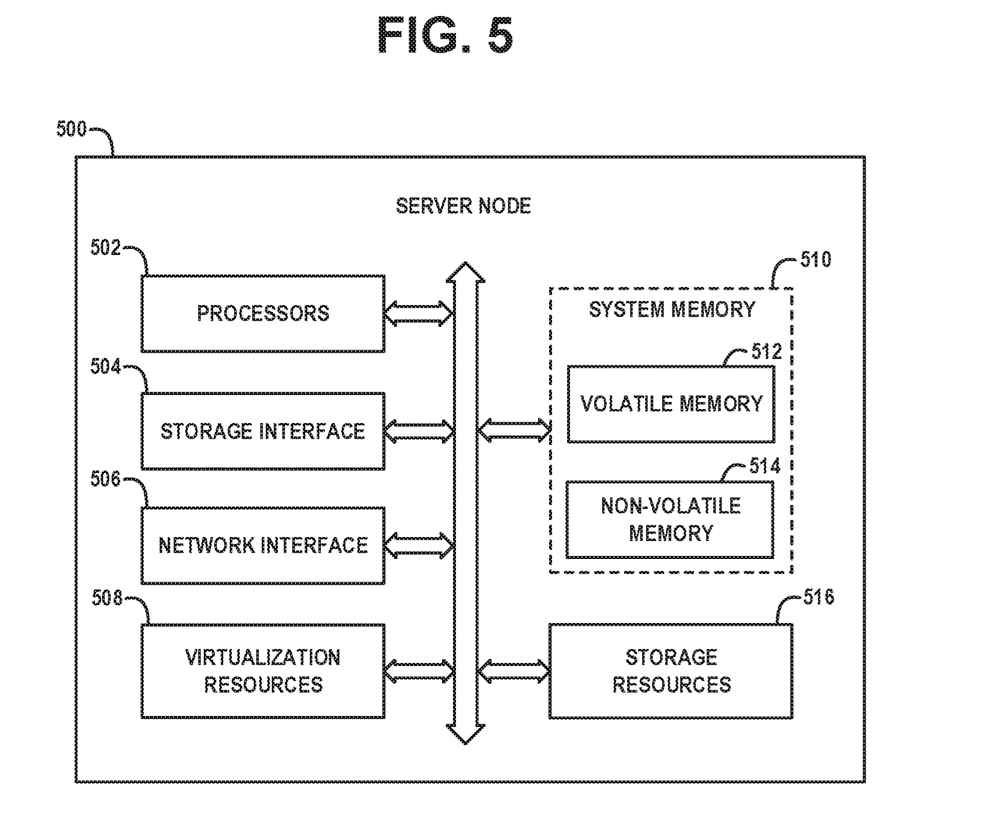
FIG. 5 schematically illustrates a framework of a computing node which is configured to host a system for automatically discovering, network configuring, and provisioning server nodes according to an exemplary embodiment of the disclosure.

FIG. 5 schematically illustrates a framework of a server node (or more generally, a computing node) for hosting an auto detect server or an auto detect client according to an exemplary embodiment of the disclosure. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more service or functions which are hosted by the server node 500. For example, the virtualization resources 508 can be configured to implement the various modules and functionalities of the auto detect server 210 (FIG. 2) as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the auto detect server 210 and the auto detect client 220 (FIG. 2), comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile system memory 512 is configured as the highest-level memory tier, and the non-volatile system memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
sending, by a cluster management system, a first message over a communications network to detect a server node connected to the communications network, wherein the server node runs a base operating system image that is configured to communicate with the cluster management system to enable the cluster management system to automatically detect the server node and to automatically configure the server node for inclusion in a server cluster in accordance with server cluster specifications;
detecting, by the cluster management system, the server node in response to receiving a second message that is sent from the base operating system image of the server node in response to the first message, wherein the second message comprises node identifying information associated with the server node;
communicating, by the cluster management system, with the base operating system image of the server node to perform a network configuration process to automatically configure one or more network settings of the server node based at least in part on the server cluster specifications and the node identifying information provided by the base operating system image of the server node; and
subsequent to completion of the network configuration process, performing, by the cluster management system, a provisioning process to automatically provision the server node for inclusion in the server cluster, wherein the provisioning process comprises re-imaging the server node with a server operating system to enable operation of the server node in the server cluster.

2. The method of claim 1, wherein the node identifying information of the second message comprises a node identifier and a node type of the server node, and wherein the second message further comprises an internet protocol (IP) address that is initially assigned to the server node by the base operating system image using Automatic Private IP Addressing (APIPA) to enable initial communication between the cluster management system and the server node.

3. The method of claim 1, wherein communicating with the base operating system image of the server node to perform the network configuration process, comprises:
sending, by the cluster management system, a third message over the communications network to the server node, wherein the third message comprises network configuration information that is specified by the cluster management system for the server node based at least in part on the server cluster specifications and the node identifying information provided by the server node; and
communicating, by the cluster management system, with the base operating system image of the server node to verify completion of a network configuration of the server node.

4. The method of claim 3, wherein the network configuration information of the third message comprises a virtual local area network (VLAN) identifier and a specified maximum transmission unit (MTU) configuration setting.

5. The method of claim 3, wherein the network configuration information of the third message comprises a network port assignment which specifies a network port to be utilized for at least one of a management network interface and a data network interface.

6. The method of claim 1, further comprising:
determining, by the cluster management system, whether the detected server node is qualified for inclusion in the server cluster based, at least in part on, the node identifying information provided in the second message;
wherein the network configuration process to automatically configure one or more network settings of the server node is performed in response to determining that the detected server node is qualified for inclusion in the server cluster.

7. The method of claim 6, wherein determining, by the cluster management system, whether the detected server node is qualified for inclusion in the server cluster comprises comparing the node identifying information of the detected server node to a whitelist of node identifying information of server nodes that are permitted to be included in the server cluster.

8. The method of claim 1, further comprising:
obtaining, by the cluster management system, hardware inventory information from the base operating system image regarding a hardware configuration of the server node; and
utilizing, by the cluster management system, the obtained hardware inventory information to determine whether the detected server node is qualified for inclusion in the server cluster based on the server cluster specifications.

9. An article of manufacture comprising a non-transitory processor-readable storage medium having stored therein program code of one or more software programs, wherein the program code is executable by one or more processors to implement a method which comprises:
sending, by a cluster management system, a first message over a communications network to detect a server node connected to the communications network, wherein the server node runs a base operating system image that is configured to communicate with the cluster management system to enable the cluster management system to automatically detect the server node and to automatically configure the server node for inclusion in a server cluster in accordance with server cluster specifications;
detecting, by the cluster management system, the server node in response to receiving a second message that is sent from the base operating system image of the server node in response to the first message, wherein the second message comprises node identifying information associated with the server node;
communicating, by the cluster management system, with the base operating system image of the server node to perform a network configuration process to automatically configure one or more network settings of the server node based at least in part on the server cluster specifications and the node identifying information provided by the base operating system image of the server node; and
subsequent to completion of the network configuration process, performing, by the cluster management system, a provisioning process to automatically provision the server node for inclusion in the server cluster, wherein the provisioning process comprises re-imaging the server node with a server operating system to enable operation of the server node in the server cluster.

10. The article of manufacture of claim 9, wherein the node identifying information of the second message comprises a node identifier and a node type of the server node, and wherein the second message further comprises an internet protocol (IP) address that is initially assigned to the server node by the base operating system image using Automatic Private IP Addressing (APIPA) to enable initial communication between the cluster management system and the server node.

11. The article of manufacture of claim 9, wherein communicating with the base operating system image of the server node to perform the network configuration process, comprises:
sending, by the cluster management system, a third message over the communications network to the server node, wherein the third message comprises network configuration information that is specified by the cluster management system for the server node based at least in part on the server cluster specifications and the node identifying information provided by the server node; and
communicating, by the cluster management system, with the base operating system image of the server node to verify completion of a network configuration of the server node.

12. The article of manufacture of claim 11, wherein the network configuration information of the third message comprises one or more of a virtual local area network (VLAN) identifier, a specified maximum transmission unit (MTU) configuration setting, and a network port assignment which specifies a network port to be utilized for at least one of a management network interface and a data network interface.

13. The article of manufacture of claim 9, further comprising program code that is executable by the one or more processors to implement a method which comprises:
determining, by the cluster management system, whether the detected server node is qualified for inclusion in the server cluster based, at least in part on, the node identifying information provided in the second message;
wherein the network configuration process to automatically configure one or more network settings of the server node is performed in response to determining that the detected server node is qualified for inclusion in the server cluster.

14. The article of manufacture of claim 13, wherein determining, by the cluster management system, whether the detected server node is qualified for inclusion in the server cluster comprises comparing the node identifying information of the detected server node to a whitelist of node identifying information of server nodes that are permitted to be included in the server cluster.

15. The article of manufacture of claim 9, further comprising program code that is executable by the one or more processors to implement a method which comprises:
obtaining, by the cluster management system, hardware inventory information from the base operating system image regarding a hardware configuration of the server node; and
utilizing, by the cluster management system, the obtained hardware inventory information to determine whether the detected server node is qualified for inclusion in the server cluster based on the server cluster specifications.

16. A computing node, comprising:
at least one processor; and
a system memory configured to store program code, wherein the program code is executable by the at least one processor to implement a cluster management system that is configured to:
send a first message over a communications network to detect a server node connected to the communications network, wherein the server node runs a base operating system image that is configured to communicate with the cluster management system to enable the cluster management system to automatically detect the server node and to automatically configure the server node for inclusion in a server cluster in accordance with server cluster specifications;
detect the server node in response to receiving a second message that is sent from the base operating system image of the server node in response to the first message, wherein the second message comprises node identifying information associated with the server node;
communicate with the base operating system image of the server node to perform a network configuration process to automatically configure one or more network settings of the server node based at least in part on the server cluster specifications and the node identifying information provided by the base operating system image of the server node; and subsequent to completion of the network configuration process, perform a provisioning process to automatically provision the server node for inclusion in the server cluster, wherein the provisioning process comprises re-imaging the server node with a server operating system to enable operation of the server node in the server cluster.

17. The computing node of claim 16, wherein the node identifying information of the second message comprises a node identifier and a node type of the server node, and wherein the second message further comprises an internet protocol (IP) address that is initially assigned to the server node by the base operating system image using Automatic Private IP Addressing (APIPA) to enable initial communication between the cluster management system and the server node.

18. The computing node of claim 16, wherein in communicating with the base operating system image of the server node to perform the network configuration process, the cluster management system is configured to:

send a third message over the communications network to the server node, wherein the third message comprises network configuration information that is specified by the cluster management system for the server node based at least in part on the server cluster specifications and the node identifying information provided by the server node; and communicate with the base operating system image of the server node to verify completion of a network configuration of the server node;

wherein the network configuration information of the third message comprises one or more of a virtual local area network (VLAN) identifier, a specified maximum transmission unit (MTU) configuration setting, and a network port assignment which specifies a network port to be utilized for at least one of a management network interface and a data network interface.

19. The computing node of claim 16, wherein the cluster management system is further configured to determine whether the detected server node is qualified for inclusion in the server cluster based, at least in part on, the node identifying information provided in the second message, wherein the network configuration process to automatically configure one or more network settings of the server node is performed in response to determining that the detected server node is qualified for inclusion in the server cluster.

20. The computing node of claim 16, wherein the cluster management system is further configured to:

obtain hardware inventory information from the base operating system image regarding a hardware configuration of the server node; and utilize the obtained hardware inventory information to determine whether the detected server node is qualified for inclusion in the server cluster based on the server cluster specifications.

* * * * *